US006237698B1

(12) United States Patent
Carrier et al.

(10) Patent No.: US 6,237,698 B1
(45) Date of Patent: May 29, 2001

(54) TERMINAL PROTECTION SYSTEM FOR PORTABLE POWER TOOLS

(75) Inventors: David Carrier, Aberdeen; Samuel G. Woods, Bel Air; Chris Yahnker, Eldersburg; Zollie W. Privett, Baltimore, all of MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/521,560

(22) Filed: Mar. 9, 2000

Related U.S. Application Data (63) Continuation-in-part of application No. 09/458,285, filed on Dec. 10, 1999.

(51) Int. Cl.[7] ...................................................... H02P 7/00
(52) U.S. Cl. .............................. 173/2; 173/171; 173/217; 310/50; 337/166; 307/66
(58) Field of Search .................................. 173/216, 2, 11, 173/217, 117, 171; 310/47, 50; 337/405, 406, 198, 166; 307/64, 66, 80

(56) References Cited

U.S. PATENT DOCUMENTS

| | | |
|---|---|---|
| 3,684,923 | 8/1972 | Keeler, II . |
| 3,728,583 | 4/1973 | Wickson . |
| 3,757,194 * | 9/1973 | Weber et al. ........................ 310/50 |
| 3,963,941 | 6/1976 | Banker . |
| 4,377,837 | 3/1983 | Matsko et al. . |
| 4,835,410 * | 5/1989 | Bhagwat et al. ...................... 307/66 |
| 5,354,215 * | 10/1994 | Viracola ................................ 310/50 |
| 5,555,914 | 9/1996 | Baker et al. . |
| 5,715,156 * | 2/1998 | Yilmaz et al. ........................ 307/80 |
| 5,816,121 * | 10/1998 | Yoshimuzu et al. ................. 173/217 |
| 5,963,122 | 10/1999 | Endo et al. . |
| 5,978,196 | 11/1999 | O'Boyle . |
| 5,984,020 * | 11/1999 | Meyer et al. .......................... 172/2 |

* cited by examiner

Primary Examiner—Scott A. Smith
(74) Attorney, Agent, or Firm—Harness, Dickey & Peirce, P.L.C.

(57) ABSTRACT

A thermal control circuit (49) for inexpensively protecting the power interface of cordless and dual-mode powered devices (12), such as hand-held power tools and appliances. The powered device includes a motor (11) that is operable in a preselected voltage range. A switch assembly (110) controls the flow of electrical energy to the motor (11). A power module (14, 16) is configured to supply electric power and to mate with the low-voltage DC power tool (12). The power module (14, 16) is adapted to provide a DC voltage in the preselected voltage range suitable for powering the low-voltage DC power tool (12). A case (91) for the power tool (12) has a pre-defined envelope for electrically and mechanically mating with the power module (14, 16). A power interface that includes at least two terminals, electrically couples the power module (14, 16) to the motor (11). The thermal control circuit (49) protects the power interface from damage caused by an overtemperature level. The thermal control circuit (49), in response to detecting an operating temperature that exceeds the overtemperature level, permanently interrupts the flow of electricity from the power module (14, 16) to the motor (11).

23 Claims, 6 Drawing Sheets

TERMINAL PROTECTION SYSTEM FOR PORTABLE POWER TOOLS

CROSS REFERENCE TO RELATED APPLICATIONS

This application is a continuation-in-part of U.S. Non-Provisional Application No. 09/458,285, filed Dec. 10, 1999 pending.

FIELD OF THE INVENTION

The present invention relates generally to electrically operated power tools and in particular, to portable hand-held power tools which can operate in a cordless mode from a self-contained power source.

BACKGROUND OF THE INVENTION

Electrically operated devices that function in a cordless mode typically include a housing which has a chamber for receiving and retaining a removable battery module. The battery module completely encloses one or more cells and provides the necessary DC power for operation of the device. Historically, cordless electrically powered devices have included relatively low power devices such as shavers and hand-held calculators. Recently, improvements in battery technology have led to the development of batteries that store more energy and are capable of driving higher power devices. These devices include for example, portable hand-held power tools and appliances operating at power levels from 50 watts up to hundreds of watts. A hand-held power tool is typically powered by a battery module that comprises a number of batteries connected in series. To provide the higher power levels required by high power devices an increased number of batteries are connected in series resulting in higher input voltages and battery module volumetric requirements.

Cordless power devices permit work operations to be performed in areas where a conventional AC power source is not available or inconvenient to use. However, the additional power interface that is required to allow battery modules to be removed for replacement and charging leads to a decrease in the reliability of the power tool. Cordless power devices universally employ electrical contacts that are incorporated into terminal blocks and connectors as the interface to electrically couple the battery module to the power device. Over the lifetime of a power device, the electrical contacts are subjected to numerous events that may lead to the eventual wear-out or premature failure of the power interface. The wear-out mechanisms include wearing due to contamination, damage, or misalignment of the terminals, as well as high currents and contact bounce caused by high vibration environments. In addition, material discrepancies and high cross-sectional currents may contribute to wearing of the contacts. As the power interface degrades, the impedance of the connection increases leading to higher power losses in the interface. The higher power losses cause increased localized heating of the contacts that is further exacerbated by the thermally isolated nature of most power interfaces, resulting in a further increase in temperature. The high temperatures contribute to the degradation of the contacts and might eventually lead to thermal runaway, resulting in melting of the connector case. A cordless power device that is not repaired before thermal runaway occurs might be irreparable. Since, a cordless power device receives electrical energy from a limited source, the battery, the device is less likely to suffer thermal runaway than a power device that operates from an unlimited power source such as 115 Vac line power. The limited nature of battery power restricts the quantity of power that might be dissipated in the power interface, thereby limiting the amount of damage to which the interface will be subjected.

There is another class of power devices, dual-mode power devices, that have recently been introduced that have a power interface and an unlimited source of electrical energy. Dual-mode power devices include an optional corded converter module that connects to an AC power source and is designed to be interchangeable with the battery module. The corded converter module converts power from the AC source to a regulated low-voltage DC level that is usable by the motor of the power device. The converter module allows a power device operator to use the device in either the cordless battery mode or the corded AC mode as needed. Thus, the availability of a converter module enables the operator to complete a project when the battery module has been discharged. However, when the dual-mode device is operated with the converter module, the power interface has the potential for receiving much greater damage under failure conditions due to the unlimited power source. Therefore, it is desirable to disable a degraded power device before extensive damage occurs to the power interface.

While the prior art can be used to provide cordless and dual-mode power devices, it has not proven capable of minimizing the potential failure of the associated power interface for the power devices.

SUMMARY OF THE INVENTION

The present invention provides a low-voltage DC power tool that includes a removable power module for supplying electrical energy. The power module is coupled to the power tool through a power interface that includes at least two terminals. A thermal control circuit senses the operating temperature of a terminal. In response to detecting an operating temperature that exceeds an overtemperature level, the thermal control circuit permanently interupts the flow of electricity from the power module to the motor.

For a more complete understanding of the invention, its objects and advantages, reference may be had to the following specification and to the accompanying drawings.

DETAILED DESCRIPTION OF THE PREFERRED EMBODIMENTS

Figure 1:
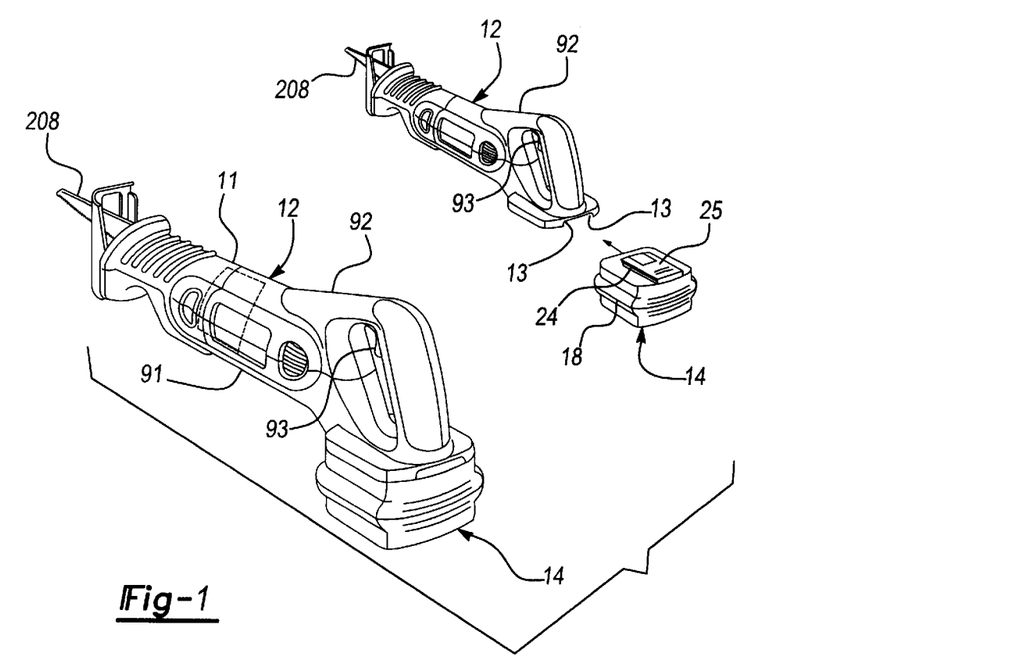
FIG. 1 is a three-dimensional view partially showing the manner of connecting a battery module to the power device.
Figure 2:
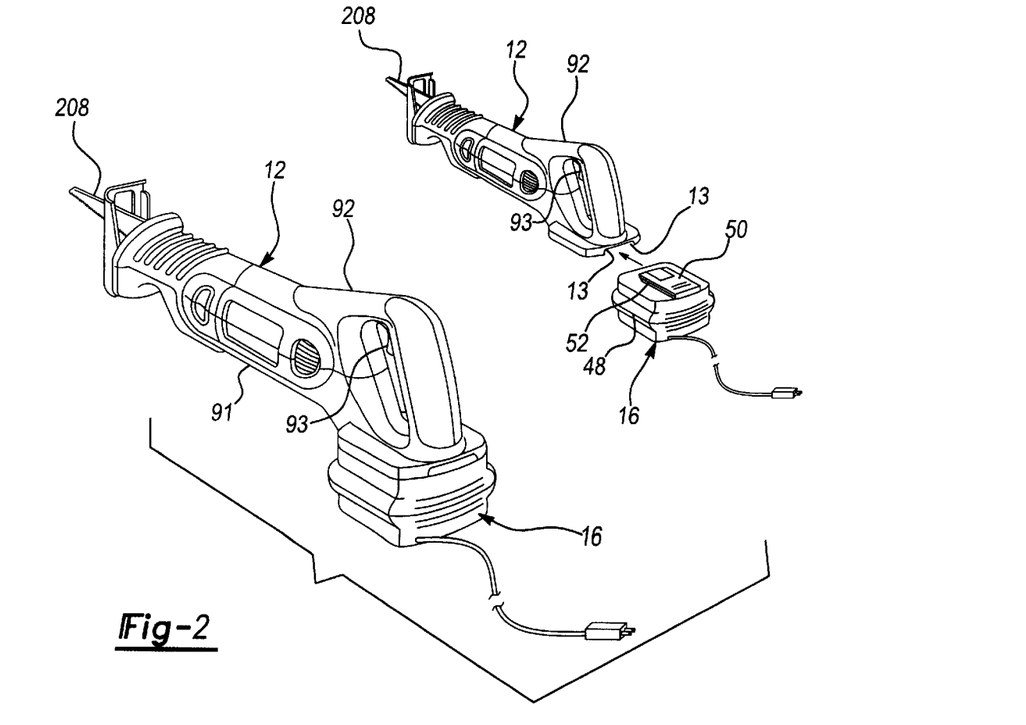
FIG. 2 is a three-dimensional view partially showing the manner of connecting a converter module to the power device.

Referring to FIGS. 1 and 2, a dual-mode portable power tool 12 according to the present invention is shown. While the present invention is shown and described with a reciprocating saw 12, it will be appreciated that the particular tool is merely exemplary and could be a circular saw, a drill, a sander, or any other similar cordless or dual-mode power tool constructed in accordance with the teachings of the present invention.

The power tool 12 includes a tool interface (not shown) which is driven by a DC motor 11. The motor 11 is mounted within a double-insulated housing 91 that includes a handle 92 extending therefrom. A trigger switch 93 is mounted in the handle 92 behind the motor 11. The DC motor 11 is adapted in the preferred embodiment to be powered by a 24 volt DC source, although other DC voltage systems, such as 18 volts or 100 volts, could be used. In a first operating mode shown in FIG. 1, the power tool 12 is powered by a removable battery module 14. Alternatively, as shown in FIG. 2, the power tool 12 may be powered from common 115 volt AC line power via a converter module 16 which is adapted to be plugged into the power tool in place of the battery module 14. Additionally, the power tool 12 may be powered from a AC/DC generator (not shown) via the converter module 16.

Figure 3A:
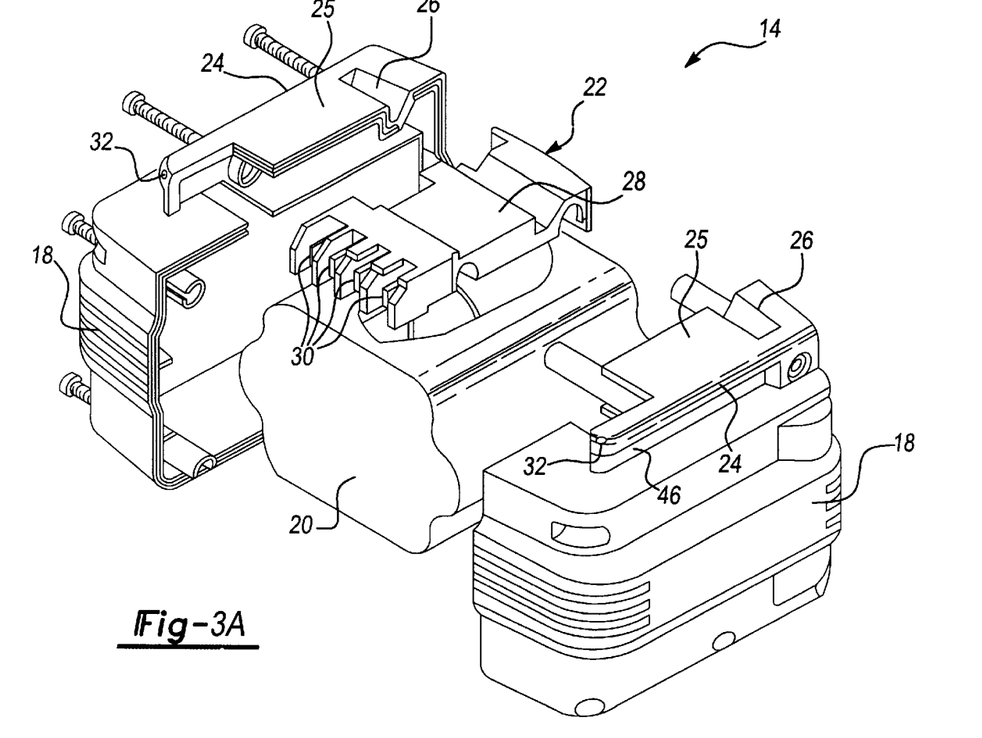
FIG. 3A is a three-dimensional exploded view of the battery module.
Figure 4:
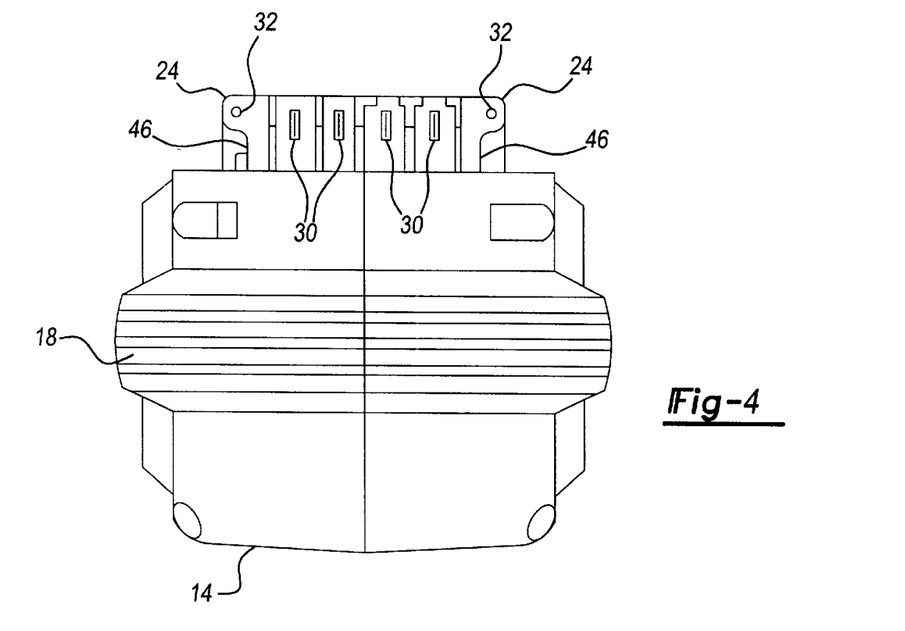
FIG. 4 is an end view of the battery module illustrating an attached terminal block.

With particular reference to FIGS. 3A and 4, the rechargeable battery module 14 of the present invention is illustrated to generally include a housing 18, a battery 20 which in the exemplary embodiment illustrated is a 24 volt nickel-cadmium battery, and a battery module terminal block 22. To facilitate releasable attachment of the battery module 14 to the tool 12, the upper portion 25 of the housing 18 is formed to include a pair of guide rails 24. The guide rails 24 are adapted to be slidably received into cooperating channels 13 (FIG. 1) formed in the power tool handle 92. To further facilitate removable attachment of the battery module 14 to the tool 12, the upper portion 25 of the battery module housing 18 further defines a recess 26. The recess 26 is adapted to receive a latch (not shown) carried by the handle 92 of the tool 12. The latch is conventional in construction and operation and is spring biased to a downward position so as to engage the recess 26 upon insertion of the rechargeable battery module 14. Removal of the battery module 14 is thereby prevented until the spring bias of the latch is overcome in a conventional manner insofar as the present invention is concerned.

With continued reference to FIGS. 3A and 4, the battery module terminal block 22 comprises a main body portion 28 constructed of rigid plastic or other suitable material and a plurality of blade-type terminals 30. In the exemplary embodiment illustrated, the battery module terminal block 22 includes four blade terminals 30. Two of the blade terminals 30 comprise the positive and negative terminals for the battery 20. A third terminal 30 may be used to monitor the temperature of the battery 20 and a fourth terminal may be used to identify the battery type (e.g., 24 volt NiCad). As best shown in FIG. 4, a pair of holes 32 are formed in the two guide rails 24 in the upper portion 25 of the battery module housing 18 on either side of the row of blade terminals 30. The function of these holes is described below.

Figure 5:
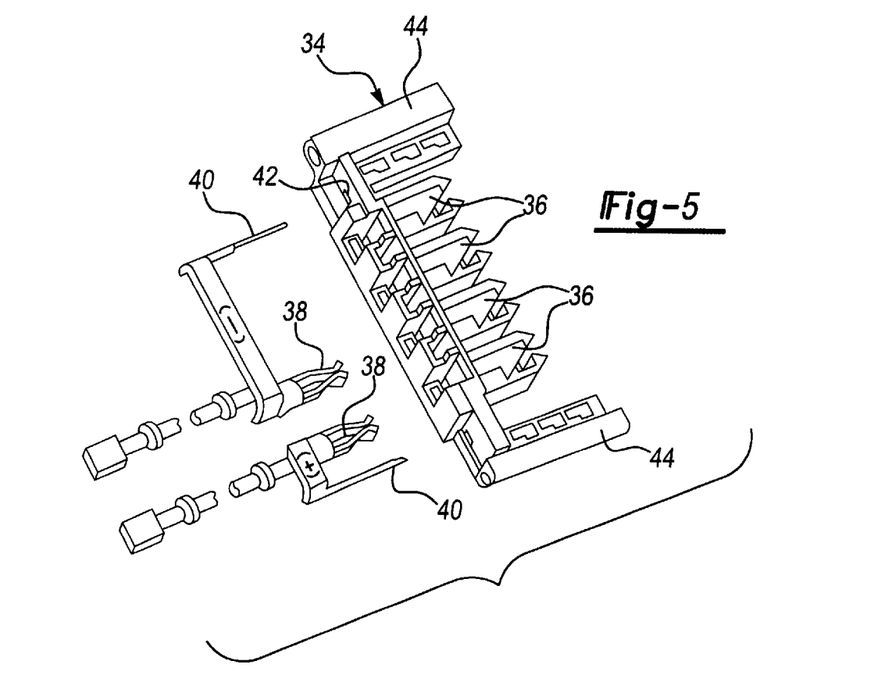
FIG. 5 is a three-dimensional view of the power tool terminal block that mates to the battery module terminal block.

Turning now to FIG. 5, the terminal block 34 of the power tool 12 is shown. The main body of the tool terminal block 34 is also constructed of a rigid plastic material and is formed with a row of four U-shaped guideways 36 guiding the four corresponding blade terminals 30 of the battery module 14 when the battery module 14 is inserted into the tool 12. Located within the guideways 36 are female connectors 38 that are adapted to engage and make electrical contact with the blade terminals 30 of the battery module 14. Although the tool terminal block 34 shown is designed to accommodate four female connectors for each of the four battery module blade terminals 30, only two female connectors 38 adapted to engage the positive and negative blade terminals 30 of the battery module 14 are used in the tool terminal block 34, as the remaining two battery pack blade terminals 30 are only used when recharging the battery module 14.

Also connected to the positive and negative female terminals 38 in the tool terminal block 34 are positive and negative male terminals 40 that project through openings 42 in the terminal block on either side of the row of guideways 36. As will subsequently be discussed below, the male positive and negative terminals 40 are used to electrically connect the tool 12 to the converter module 16.

Figure 6:
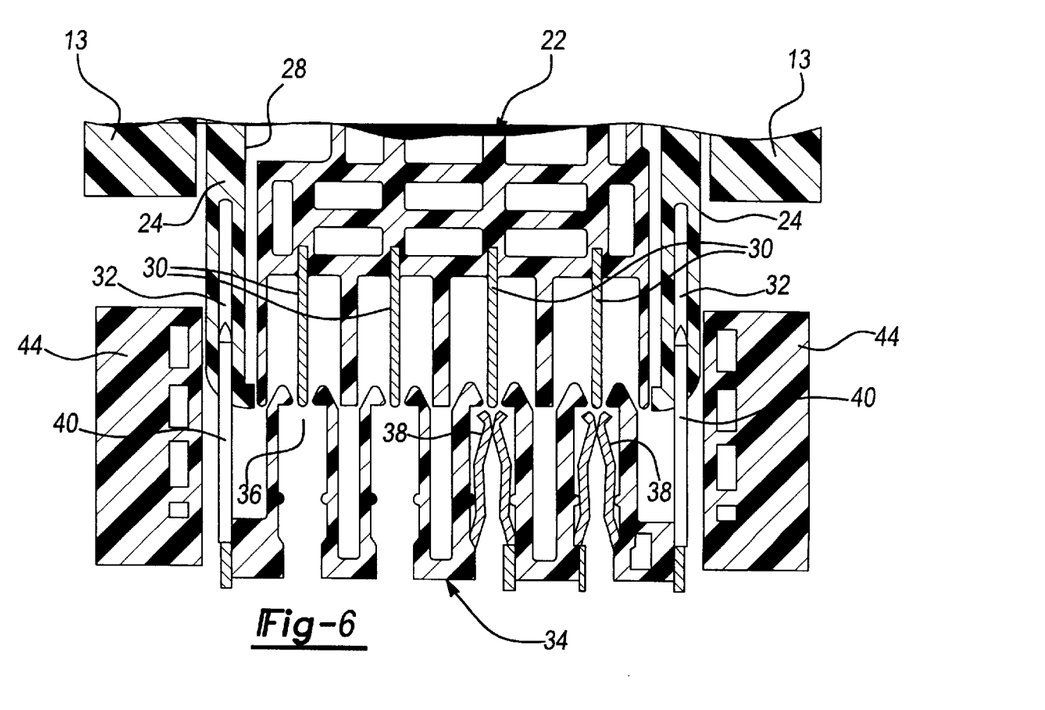
FIG. 6 is a two-dimensional view of the interface between the battery module terminal block and the power tool terminal block.

With additional reference to FIG. 6, the interface between the battery terminal block 22 and the tool terminal block 34 is illustrated. As the guide rails 24 of the battery module 14 are slid into the channels 13 in the tool housing, the battery module terminal block 22 is guided into alignment with the tool terminal block 34 as shown. To further facilitate proper alignment between the two terminal blocks 22 and 34, the main body portion of the tool terminal block 34 includes a pair of laterally spaced rails 44 that are adapted to be received within the grooves 46 provided in the battery module housing 18 immediately below the guide rails 24. Further insertion of the battery module 14 onto the tool 12 results in the positive and negative blade terminals 30 of the battery module 14 passing through the openings in the U-shaped guideways 36 and engaging the female connectors 38 in the tool terminal block 34. Note that the male positive and negative terminals 40 from the tool terminal block 34 simultaneously project into the openings 32 formed in the rails 24 on the upper portion 25 of the battery pack housing 18, but do not make electrical contact with any terminals in the battery module 14. Similarly, the remaining two blade terminals 30 from the battery terminal block 22 project into empty guideways 36 in the tool terminal block 34.

Figure 3B:
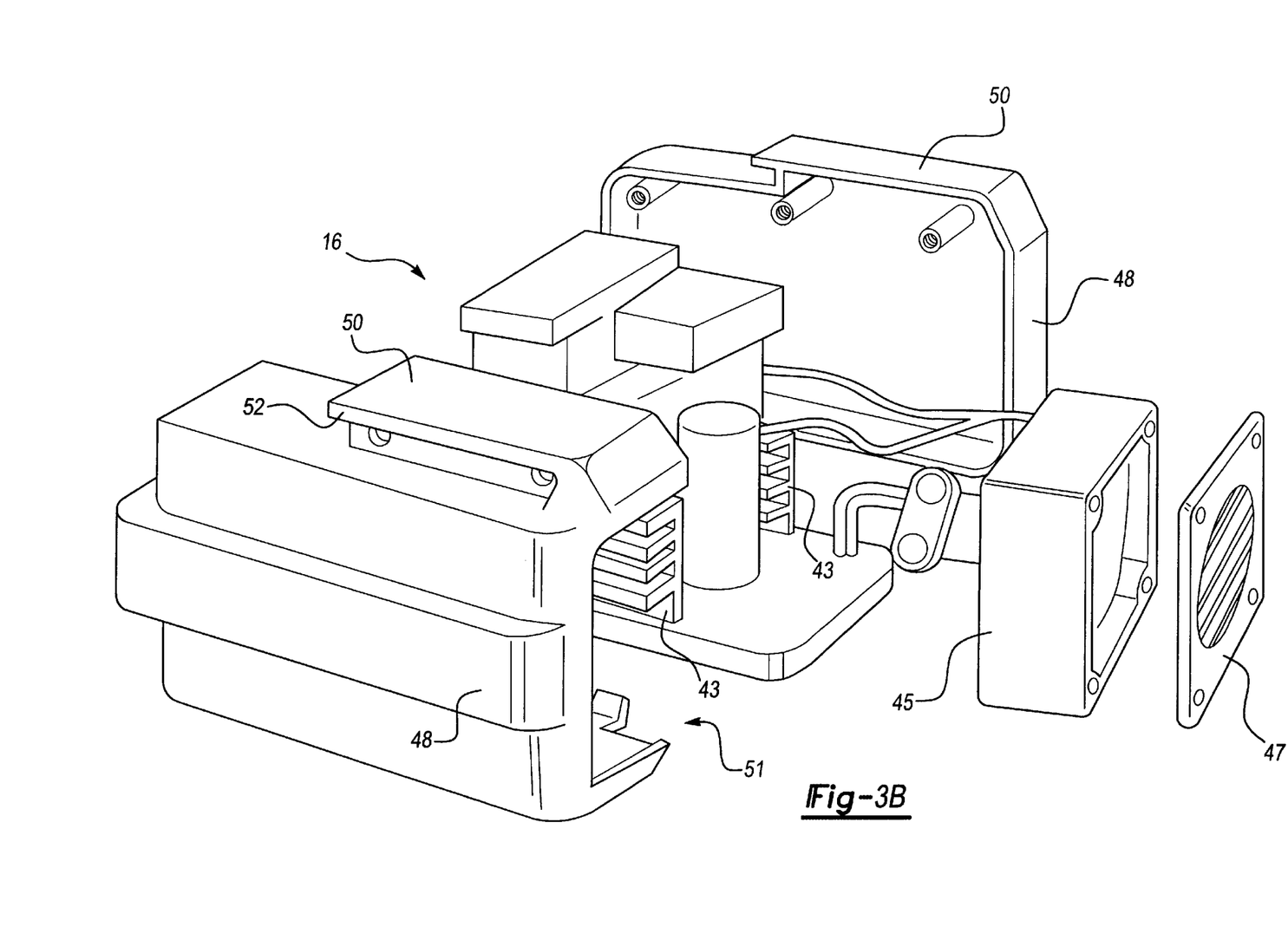
FIG. 3B is a three-dimensional exploded view of the converter module.

Returning to FIG. 2 with reference to FIG. 3B, the converter module 16 according to the present invention is adapted to convert 115 volts AC house current to 24 volts DC. The housing 48 of the converter module 16 in the preferred embodiment is configured to be substantially similar to the housing 18 of the battery module 14. In this regard, the housing 48 includes first and second clam shell halves joined at a longitudinally extending parting line. An upper portion 50 of the housing 48 includes a pair of guide rails 52 similar to those of the battery module 14 for engaging the channels 13 in the tool housing. The upper portion 50 also defines a recess (not shown) which includes a latch (not shown) for preventing the inadvertent removal of the converter module 16. The housing 48 also defines a recess 51 in which a fan 45 is adapted for providing cooling airflow to the converter module 16. Attached to the fan 45 is a fan cover 47 for preventing foreign objects from impeding the operation of the fan 45. Within the housing 48 several heatsinks 43 provide heat spreading and cooling for selected power converter components.

Figure 7:
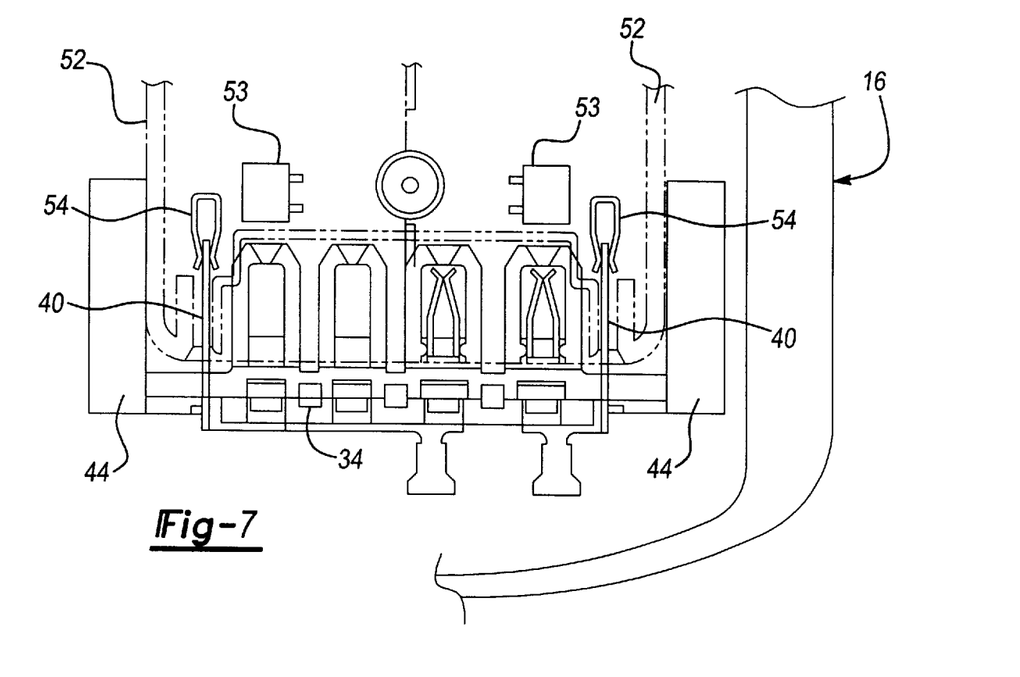
FIG. 7 is a two-dimensional view of the interface between the converter module terminal block and the power tool terminal block.

With additional reference to FIG. 7, the interface between the converter module 16 and tool terminal block 34 is shown. The converter module 16 includes a pair of female terminals 54 that are adapted to receive the male terminals 40 of the tool terminal block 22. Due to the non-isolated nature of the converter module 16, the female terminals 54 are recessed within the upper portion 50 of the housing 48 of the converter module 16 by at least 8 mm to meet safety requirements. In a manner similar to that described above in connection with the installation of the battery module 14 on the tool 12, the guide rails 52 on the upper portion 50 of the converter housing 48 are adapted to engage the laterally spaced rails 44 on the tool terminal block 34 as the converter module 16 is installed on the tool 12 to ensure proper alignment between the female connectors 54 of the converter module 16 and the male connectors 40 of the tool 12. A pair of temperature cut-offs (TCOs) 53 are co-located near the female terminals 54. The TCOs change state from a short to an open when the operating temperature of the female terminals 54 exceeds 102° C. The scope of the invention includes using any type of thermostatic device that changes state or resistance when the device is subjected to an operating temperature that is greater than a predetermined temperature. Additionally, the scope of the invention encompasses using a single TCO that is thermally coupled to one or more terminals.

Figure 8:
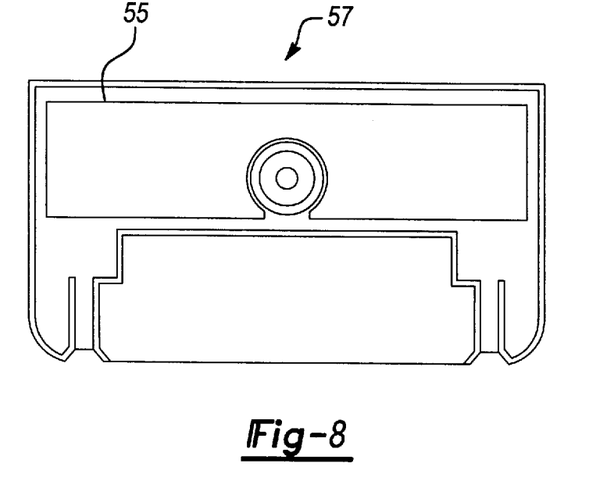
FIG. 8 is a two-dimensional view of a cover for the converter module terminal block.

Referring to FIG. 8, a cover 57 for enclosing the converter terminal block is illustrated. A heat pipe 55 affixed to the cover 57 thermally couples the TCOs 53 to the female terminals 54. In the presently preferred embodiment an electrically insulating thermal pad is used as the heat pipe, however the scope of the invention encompasses also using electrically conductive thermal conductors. For ease of assembly, a self-adhesive backing of the heat pipe 55 is used to affix the heat pipe 55 to the converter terminal block cover 57.

Figure 9:
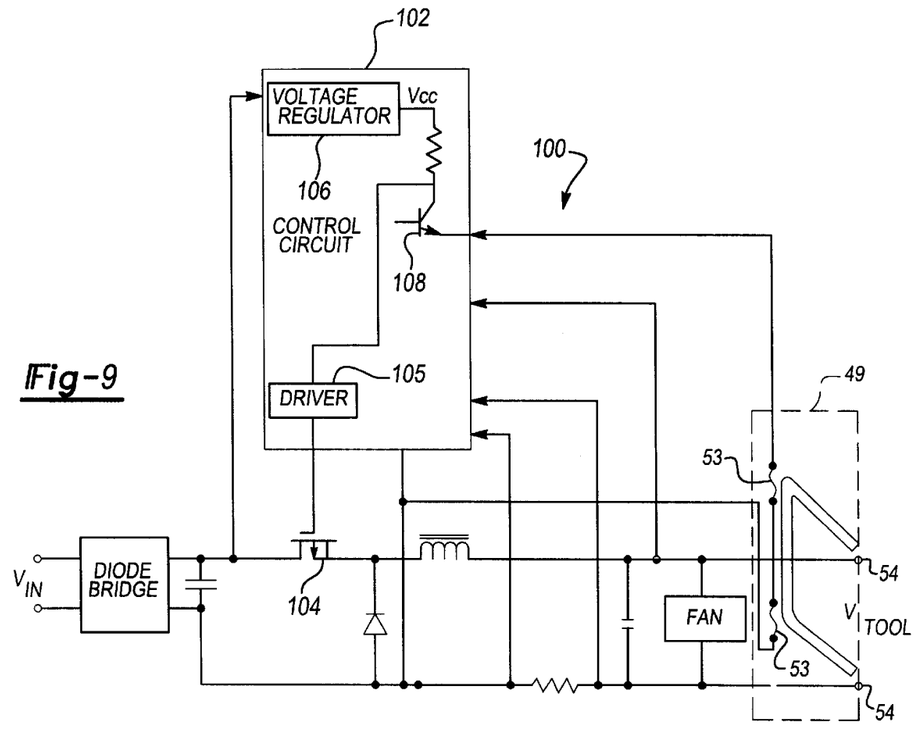
FIG. 9 is a block diagram of a power converter assembled and contained within the converter module.

As illustrated in block diagram form in FIG. 9, the converter module 16 of the presently preferred embodiment includes a non-isolated buck converter that operates at a frequency of about 40 kHz. 115 volt AC power is converted to 24 volt DC power by the converter module 16 and delivered to the tool 12 through the female terminals 54. When the converter module 16 is operatively installed on the tool 12, the female terminals 38 of the tool terminal block 34 are electrically inoperative. Although the presently preferred embodiment of the converter module 16 is a fixed-frequency, non-isolated, buck-derived topology; the principles of the invention encompass using variable-frequency converters, transformer-isolated converters, and topologies other than buck-derived, such as Cük and flyback converters. A control circuit 102 regulates the output voltage, Vtool, of the converter 100 by varying the duty cycle of a power MOSFET 104 that chops the filtered input voltage. The converter output voltage is coupled through the power interface to the motor 11 in the power tool 12. A driver 105 within the converter module control circuit 102 provides a buffered drive signal for controlling the MOSFET 104. The control circuit 102 includes a voltage regulator 106 to generate an internal voltage, Vcc, for powering the control circuit 102. A thermal control circuit 49 that includes the TCOs 53 and heat pipe 55 connects to the control circuit 102. The thermal control circuit 49 disables the converter output when the temperature of the power interface exceeds a predetermined temperature. The pair of TCOs 53 electrically couple to a control circuit output transistor 108 that supplies the drive signal to the driver 105. Each of the TCOs 53 normally presents a low impedance. When the operating temperature of one of the TCOs 53 exceeds a predetermined threshold temperature, the TCO changes state permanently to a high impedance. As a result, the drive signal that flows through the output transistor 108 and TCOs 53 is permanently disabled until the TCO is replaced. When the drive signal is disabled, the MOSFET 104 changes to an open impedance, thereby interrupting the flow of current through the power interface to the motor 11. The scope of the invention encompasses using other control inputs to disable the control circuit 102. Control inputs such as shutdown inputs, current sense inputs, overcurrent inputs, reference voltage shutdown, and voltage feedback inputs are envisioned. The scope of the invention also includes a similar connection of a TCO to the switch assembly 110 (see FIG. 10) to interrupt the flow of power through the power interface.

The power tool 12 of the present invention uses TCOs in a unique manner. Conventional usage of TCOs entails connecting the devices in series with a device that is to be protected from operating when ambient temperatures exceed a predetermined level. When the ambient temperature exceeds the predetermined level, the TCO changes state to an open, thereby preventing current from flowing into the protected device. To reset the TCO to a short, the TCO must be replaced. Since the current that flows through the protected device also flows through the TCO, the physical size of the required TCO increases with increasing current. To protect a power interface that passes currents that are several amps or more, a relatively large TCO is required for each terminal. The power tool 12 of the present invention uses a TCO that has a current rating that is substantially less than the current that flows through the protected device (power interface). In addition, the TCO changes state based upon the operating temperature of the power interface, not the ambient temperature of the surrounding air. Thermally coupling the power interface to a TCO prevents the power interface from being damaged by a runaway thermal failure. Instead, once the temperature of the power interface reaches a predetermined temperature, the flow of current through the interface is disabled. In addition, not placing the TCO in the current path of the power interface terminal, enables the use of a significantly smaller TCO to protect the power interface.

Figure 10:
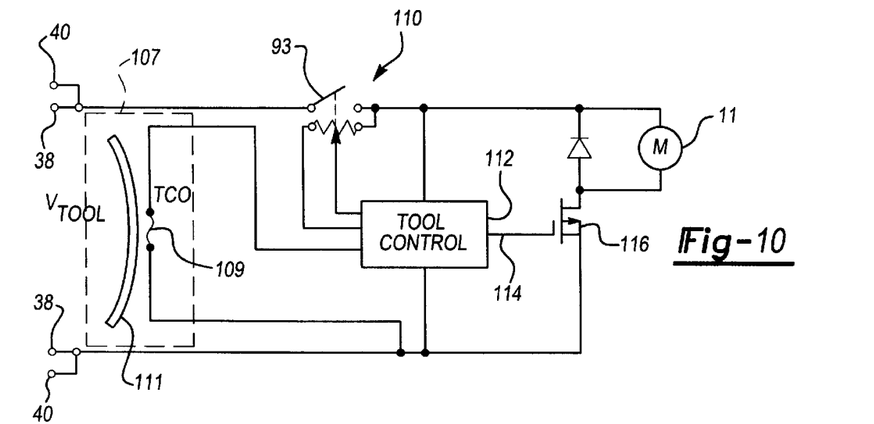
FIG. 10 is a schematic diagram of a switch assembly.

Referring to FIG. 10, an alternative method of using a TCO 109 to protect the power interface is illustrated. Here, the TCO 109 electrically connects to the switch assembly 110. The switch assembly 110 controls the application of power to the motor 11. The trigger switch 93 is connected in series with the power to the tool 12 and the motor 11. The trigger switch 93 provides on/off control of the application of power to the motor 11 in a manner known to those skilled in the art. A variable resistance output of the trigger switch 93 connects to a tool control 112 to provide variable control. In response to resistance changes, the tool control 112 provides variable control of the application of power to the motor 11 ranging from approximately 0% to 100% power. An output 114 of the tool control 112 provides a variable duty cycle that is related to the position of the trigger switch 93. The output 114 controls the switching of a switch 116 that is in series with the motor 11, thereby providing variable motor speed. A thermal control circuit 107 comprising the TCO 109 and heat pipe 111 connects to the tool control 112. The thermal control circuit 107 disables the tool control output when the temperature of the power interface exceeds a predetermined temperature. The TCO 109 is thermally coupled to both pairs of tool terminals 38 and 40 by means of a single electrically insulated heat pipe 113. The TCO 109 electrically couples to the tool control 112 to disable the tool control output when the operating temperature of the terminals 38 and 40 exceeds a predetermined temperature. Disabling the output 114, permanently interrupts the current flowing through the power interface, thereby eliminating the temperature increase caused by electrical power loss in the interface. To re-enable the output 114, the TCO must be replaced.

The thermal control circuit of the present invention protects the power interface of a dual-mode power tool from thermal runaway. A power interface operating temperature that exceeds a predetermined threshold temperature causes the thermal control circuit to latch-off the flow of power through the interface, thereby preventing self-heating of the interface. Latching-off power prevents additional heating that would be caused by continuously cycling power into a failure condition.

In addition, the thermal control circuit is designed with a comparatively small number of components while protecting the power interface from relatively large currents. This enhances the lightweight, compact features of the power tool 12. The size of the thermal control circuit further permits the use of a power converter in power-operated devices, such as the reciprocating saw 12, which heretofore were too small to support and contain conversion units providing power in a range of at least 50 watts and higher.

Further, while the preferred embodiment of the thermal control circuit disables the output of the converter module, the thermal control circuit can be used to disable the switch assembly output. This permits the power interface to be protected when the power tool 12 is operated from a battery module having a large quantity of stored energy relative to the output power of the power tool.

The reciprocating saw 12 is merely illustrative of one example of many power-operated, cordless-mode and dual-mode devices. Other examples of power-operated cordless devices which are enhanced by the inventive concept include, but are not limited to, drills, screwdrivers, screwdriver-drills, hammer drills, jig saws, circular saws, hedge trimmers, grass shears, as well as battery-operated household products and the like.

Thus it will be appreciated from the above that as a result of the present invention, a power interface for power-operated cordless and dual-mode devices is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

We claim:

1. A low-voltage DC power tool comprising:
   a motor operable in a preselected voltage range for converting electrical energy to mechanical energy;
   a switch assembly to control the flow of electrical energy to the motor;
   a power module configured to supply electric power and to mate with the low-voltage DC power tool, said power module being adapted to provide a DC voltage in the preselected voltage range suitable for powering the low-voltage DC power tool;
   a case having a pre-defined envelope for electrically and mechanically mating with the power module;
   a power interface having at least two terminals to electrically couple the power module to the motor, a terminal having an operating temperature; and
   a thermal control circuit to protect the terminal from damage caused by an overtemperature level such that the thermal control circuit, in response to detecting that the terminal operating temperature exceeds the overtemperature level, permanently interrupts the flow of electricity from the power module to the motor.

2. The power tool of claim 1 wherein the power module is a corded converter module electrically and mechanically configured to connect to a source of relatively high voltage electric power and to mate with the low-voltage DC power tool, said converter module being adapted to convert said relatively high voltage electric power from the source of electric power to a DC voltage in the preselected voltage range suitable for powering the low-voltage DC power tool.

3. The power tool of claim 2 wherein the corded converter module further includes a control circuit to regulate the conversion of the relatively high voltage electric power to the DC voltage.

4. The power tool of claim 1 wherein the power module is a cordless battery module mechanically and electrically configured to mate with the low-voltage DC power tool and to contain a battery assembly having a DC voltage in the preselected voltage range suitable for powering the low-voltage DC power tool, said battery module to provide power from the battery assembly to the DC power tool;
   wherein the power tool is configured to receive power from either the corded converter module or the cordless battery module.

5. The power tool of claim 1 wherein the power interface further comprises a physical envelope configuration to accept either of said corded converter module and said cordless battery module.

6. The power tool of claim 5 wherein the power interface further comprises an electrical connector operative to electrically connect to an electrical connector attached to either of said corded converter module and said cordless battery module.

7. The power tool of claim 6 wherein the corded converter module electrical connector is a terminal block and the battery module electrical connector is a terminal block.

8. The power tool of claim 3 wherein the thermal control circuit is coupled to the converter module control circuit.

9. The power tool of claim 1 wherein the thermal control circuit is coupled to the switch assembly.

10. The power tool of claim 1 wherein the thermal control circuit includes a first temperature sensing device having a first state and a second state, being thermally coupled to a terminal of the power interface, wherein the terminal overtemperature condition causes the first temperature sensor to change state.

11. The power tool of claim 10 wherein the thermal control circuit further includes a heat pipe coupled between the terminal and the first temperature sensing device.

12. The power tool of claim 11 wherein the heat pipe is an electrical insulator.

13. The power tool of claim 10 wherein the thermal control circuit further includes an electrically insulating heat pipe coupled between at least two terminals of the power interface and the first temperature sensing device.

14. The power tool of claim 11 wherein the thermal control circuit further includes a second temperature sensor thermally coupled to the terminal for limiting the current flowing through the terminal in response to a sensed terminal temperature.

15. The power tool of claim 10 wherein the first temperature sensing device is located near the terminal of the power interface.

16. A low-voltage DC power tool comprising:
a motor operable in a preselected voltage range for converting electrical energy to mechanical energy;
a switch assembly to control the flow of electrical energy to the motor;
a corded converter module electrically and mechanically configured to connect to a source of relatively high voltage electric power and to mate with the low-voltage DC power tool, the converter module including a control circuit being adapted to regulate the conversion of relatively high voltage electric power from the source of electric power to a DC voltage in the preselected voltage range suitable for powering the low-voltage DC power tool;
a case having a pre-defined envelope for electrically and mechanically mating with the power module;
a power interface having at least two terminals to electrically couple the power supply module to the motor; and
a thermal control circuit, in response to sensing a terminal overtemperature condition, to permanently interrupt the flow of electricity from the converter module to the motor.

17. The power tool of claim 16 wherein the thermal control circuit is coupled to the converter module control circuit.

18. The power tool of claim 16 wherein the thermal control circuit is coupled to the switch assembly.

19. The power tool of claim 16 wherein the power interface comprises a first terminal block mounted to the converter module and a second terminal block mounted to the power tool.

20. The power tool of claim 16 wherein the thermal control circuit further includes a heat pipe coupled between the terminal and a first temperature sensing device.

21. The power tool of claim 20 wherein the heat pipe is an electrical insulator.

22. The power tool of claim 20 wherein the heat pipe is coupled between at least two terminals of the power interface and the first temperature sensing device.

23. The power tool of claim 16 wherein the thermal control circuit further includes a second temperature sensor thermally coupled to the terminal for limiting the current flowing through the terminal in response to a sensed terminal temperature.

* * * * *